US005747606A

United States Patent [19]
Pfaendner et al.

[11] Patent Number: 5,747,606
[45] Date of Patent: May 5, 1998

[54] INCREASING THE MOLECULAR WEIGHT OF POLYESTERS AND PREMIX USEFUL FOR THIS PROCESS

[75] Inventors: Rudolf Pfaendner, Rimbach; Kurt Hoffmann; Heinz Herbst, both of Lautertal, all of Germany

[73] Assignee: Ciba Specialty Chemicals Corporation, Tarrytown, N.Y.

[21] Appl. No.: 893,398

[22] Filed: Jul. 11, 1997

Related U.S. Application Data

[63] Continuation of Ser. No. 535,095, filed as PCT/EP94/01108 published as WO94/24188, abandoned.

[30] Foreign Application Priority Data

Apr. 21, 1993 [CH] Switzerland .................. 1208/93

[51] Int. Cl.$^6$ .................. C08F 283/00; C08G 79/02; C08L 85/02
[52] U.S. Cl. .................. 525/438; 525/444; 525/506; 525/533; 525/538; 528/89; 528/99; 528/100; 528/176; 528/194; 528/275; 528/286; 528/287
[58] Field of Search .................. 525/438, 444, 525/506, 533, 538; 528/89, 99, 100, 176, 194, 275, 286, 287

[56] References Cited

U.S. PATENT DOCUMENTS

| | | | |
|---|---|---|---|
| 3,281,505 | 10/1966 | Spivak | 260/953 |
| 3,310,575 | 3/1967 | Spivak | 524/132 |
| 3,489,722 | 1/1970 | Kotani et al. | 524/132 |
| 3,901,848 | 8/1975 | Dibattista et al. | 524/131 |
| 4,069,200 | 1/1978 | Spivak | 524/131 |
| 4,277,391 | 7/1981 | Charles | 260/40 |
| 4,302,382 | 11/1981 | Spanswick | 260/45.8 |
| 4,485,196 | 11/1984 | Speranza et al. | 521/172 |
| 4,659,514 | 4/1987 | Beuke | 260/104 |
| 4,775,497 | 10/1988 | Pastor et al. | 528/286 |
| 4,778,840 | 10/1988 | Linhart et al. | 524/131 |
| 4,933,429 | 6/1990 | McCracken et al. | 528/272 |
| 4,999,388 | 3/1991 | Okamoto | 523/400 |
| 5,013,818 | 5/1991 | Takemura et al. | 525/438 |
| 5,254,288 | 10/1993 | Verheijen et al. | 528/308 |
| 5,283,295 | 2/1994 | Light et al. | 525/439 |
| 5,380,793 | 1/1995 | Pepper | 525/48 |

FOREIGN PATENT DOCUMENTS

| | | |
|---|---|---|
| 0032586 | 7/1981 | European Pat. Off. . |
| 0074337 | 3/1986 | European Pat. Off. . |
| 0334620 | 9/1989 | European Pat. Off. . |
| 0387565 | 9/1990 | European Pat. Off. . |
| 4034459 | 5/1992 | Germany . |

OTHER PUBLICATIONS

Polym. Prepr., vol. 29 (1), pp. 567–570, (1988).
Kunststoffe, vol. 82, pp. 284–288, (1992).
Kunststoffe, vol. 74, pp. 218–221, (1984).
Journal of Applied Polymer Science, vol. 50, pp. 1501–1509, (1993).

Primary Examiner—Randy Gulakowski
Attorney, Agent, or Firm—Victoria M. Malia; Luther A. R. Hall

[57] ABSTRACT

An increase in the molecular weight of polyester and recycled polyester can be achieved by blending said polyester with a difunctional epoxy resin and a sterically hindered hydroxyphenylalkylphosphonic acid ester or half-ester and heating the blend to above the melting point (glass transition temperature) of the polyester.

9 Claims, No Drawings

INCREASING THE MOLECULAR WEIGHT OF POLYESTERS AND PREMIX USEFUL FOR THIS PROCESS

This application is a continuation of application Ser. No. 08/535,095, filed as PCT/EP94/01108 published as WO94/24188 now abandoned.

The present invention relates to a process for increasing the molecular weight of polyesters and to the polyesters obtainable by said process.

Polyesters as exemplified by polyethylene terephthalate (PET) and polybutylene terephthalate (PBT) are important thermoplastics belonging to the group of engineering plastics. Partially crystalline polyesters are used for injection moulding compounds and have superior strength and rigidity, high dimensional stability and good wear properties. Amorphous polyesters have high transparency, superior toughness and very good resistance to stress-cracking, and can be processed to hollow objects. The mechanical and physical properties depend essentially on the molecular weight of the polymer. Reduced molecular weight makes possible only a limited high-quality recycling of used polyesters and production waste without carrying out an aftertreatment.

It is generally known to enhance the material properties of used polyesters, i.e. polyesters damaged by heat or hydrolysis, which damage is typically accompanied by a molecular weight reduction. As polycondensates, polyesters may be treated by a postcondensation in the solid state (S. Fakirov, Kunststoffe 74 (1984), 218 and R. E. Grützner, A. Koine, Kunststoffe 82 (1992), 284). However, this method is troublesome and is, moreover, highly sensitive to the impurities that may be present in waste material.

It is therefore the object of this invention to provide a practicable process that makes it possible to increase the molecular weight of polyesters, especially PET, in a relatively short time.

Surprisingly, it has been found possible to increase the molecular weight of polyesters substantially by fusing the polyester and blending it with a mixture of at least one difunctional epoxy resin and a sterically hindered hydroxyphenylalkylphosphonic acid ester or half-ester. This molecular weight increase effects an enhancement of the properties of the polyesters, preferably of those used for injection moulding and of recyclates, especially PET bottle scrap material.

Accordingly, the invention relates to a process for increasing the molecular weight of polyesters, which comprises heating a polyester blended with a difunctional epoxy resin and a sterically hindered hydroxyphenylalkylphosphonic acid ester or half-ester to above the melting point (glass transition temperature) of the polyester.

The invention is, however, also suitable for affording effective stabilisation of a polyester during processing if a molecular weight increase is not the intended objective.

The polyesters may be homo- or copolyesters that are derived from aliphatic, cycloaliphatic or aromatic dicarboxylic acids and diols or hydroxycarboxylic acids. In addition, mixtures of these polyesters or of polyesters with further plastics are also suitable, for example PBT/PC or PBT/ABS. Their composition will depend essentially on the desired properties for a specific end use.

The aliphatic dicarboxylic acids may contain from to 2 to 40 carbon atoms, the cycloaliphatic dicarboxylic acids from 6 to 10 carbon atoms, the aromatic dicarboxylic acids from 8 to 14 carbon atoms, the aliphatic hydrocarboxylic acids from 2 to 12 carbon atoms and the aromatic and cycloaliphatic hydroxycarboxylic acids from 7 to 14 carbon atoms.

The aliphatic diols may contain from 2 to 12 carbon atoms, the cycloaliphatic diols from 5 to 8 carbon atoms and the aromatic diols from 6 to 16 carbon atoms.

Aromatic diols will be understood as meaning those in which two hydroxyl groups are bonded to one or to different aromatic hydrocarbon radicals.

The polyesters may also be branched with minor amounts, typically 0.1 to 3 mol %, based on the dicarboxylic acids, of more than difunctional monomers (e.g. pentaerythritol or trimellitic acid).

If the polyesters are based on at least three monomers, said monomers can be randomly distributed, or they may be block polymers.

Suitable dicarboxylic acids are linear and branched saturated aliphatic dicarboxylic acids, aromatic dicarboxylic acids and cycloaliphatic dicarboxylic acids.

Suitable dicarboxylic acids are those containing 2 to 40 carbon atoms, typically oxalic acid, malonic acid, dimethylmalonic acid, succinic acid, octadecylsuccinic acid, pimelic acid, adipic acid, trimethyladipic acid, sebacic acid, azelaic acid and dimer acids (dimerisation products of unsaturated aliphatic carboxylic acids such as oleic acid), alkylated malonic and succinic acids such as octadecylsuccinic acid.

Suitable cycloaliphatic dicarboxylic acids are:
1,3-cyclobutanedicarboxylic acid, 1,3-cyclopentanedicarboxylic acid, 1,3- and 1,4-cyclohexanedicarboxylic acid, 1,3- and 1,4-(dicarboxylmethyl)cyclohexane, 4,4'-dicyclohexyldicarboxylic acid.

Suitable aromatic dicarboxylic acids are:
preferably terephthalic acid, isophthalic acid, o-phthalic acid, as well as 1,3-, 1,4-, 2,6- or 2,7-naphthalenedicarboxylic acid, 4,4'-diphenyldicarboxylic acid, 4,4'-diphenylsulfonecarboxylic acid, 1,1,3-trimethyl-5-carboxyl-3-(p-carboxylphenyl)indane, 4,4'-diphenyl ether dicarboxylic acid, bis-p-(carboxylphenyl)methane.

The aromatic dicarboxylic acids are preferred, including in particular terephthalic acid and isophthalic acid.

Further suitable dicarboxylic acids are those that contain —CO—NH— groups and which are disclosed in DE-A 2 414 349. Dicarboxylic acids that contain N-heterocyclic rings are also suitable, for example those that are derived from carboxylalkylated, carboxylphenylated or carboxybenzylated monoamine-s-triazinedicarboxylic acids (q.v. DE-A 2 121 184 and 2 533 675), mono- or bishydantoins, benzimidazolenes or halogenated benzimidazolenes or parabanic acid. The carboxyalkyl groups may contain from 3 to 20 carbon atoms.

Suitable aliphatic diols are the linear and branched aliphatic glycols, preferably those containing 2 to 12, most preferably 2 to 6, carbon atoms in the molecule, typically including:

ethylene glycol, 1,2- and 1,3-propylene glycol, 1,2-, 1,3-, 2,3- or 1,4-butanediol, pentyl glycol, neopentyl glycol, 1,6-hexanediol, 1,12-dodecanediol. A suitable cycloaliphatic diol is conveniently 1,4-dihydroxycyclohexane. Further suitable aliphatic diols are typically 1,4-bis(hydroxymethyl)cyclohexane, aromatic-aliphatic diols such as p-xylylene glycol or 2,5-dichloro-p-xylylene glycol, 2,2-(β-hydroxyethoxyphenyl)propane, as well as polyoxyalkylene glycols such as diethylene glycol, triethylene glycol or polyethylene glycol. The alkylene diols are preferably linear and preferably contain 2 to 4 carbon atoms.

Preferred diols are the alkylene diols, 1,4-dihydroxycyclohexane and 1,4-bis(hydroxymethyl)cyclohexane. Ethylene glycol and 1,4-butanediol are especially preferred.

Further suitable aliphatic diols are the β-hydroxyalkylated, preferably β-hydroxyethylated, bisphenols such as 2,2-bis[4'-(β-hydroxyethoxy)phenyl]propane. Further bisphenols are mentioned hereinafter.

A further group of suitable aliphatic diols comprises the heterocyclic diols disclosed in German Offenlegungsschrift specifications 1 812 003, 2 342 432, 2 342 372 and 2 453 326

Illustrative examples are:

N,N'-bis(β-hydroxyethyl-5,5-dimethyl)hydantoin, N,N'-bis(β-hydroxypropyl-5,5-dimethyl)hydantoin, methylenebis [N-(β-hydroxyethyl)-5-methyl-5-ethylhydantoin], methylenebis[N-(β-hydroxyethyl)-5,5-dimethylhydantoin], N,N'-bis(β-hydroxyethylbenzylimidazolone, -(tetrachloro) benzimidazolone or -(tetrabromo)benzimidazolone.

Suitable aromatic diols are mononuclear diphenols and, preferably, dinuclear diphenols which carry a hydroxyl group at each aromatic nucleus. By aromatic are meant preferably aromatic hydrocarbon radicals such as phenylene or naphthylene. In addition to e.g. hydroquinone, those bisphenols merit special mention that may be illustrated by the following formulae:

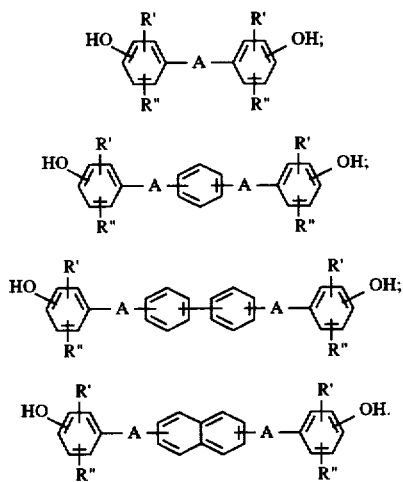

The hydroxyl groups may be in m-position, but are preferably in p-position. R' and R" in this formula may be alkyl of 1 to 6 carbon atoms, halogen such as chloro or bromo and, in particular, hydrogen atoms. A may be a direct bond or O, S, SO₂, CO, P(O)(C₁–C₂₀alkyl), unsubstituted or substituted alkylidene, cycloalkylidene or alkylene.

Unsubstituted or substituted alkylidene is exemplified by:

ethylidene, 1,1- or 2,2-propylidene, 2,2-butylidene, 1,1-isobutylidene, pentylidene, hexylidene, heptylidene, octylidene, dichloroethylidene, trichloroethylidene.

Illustrative examples of unsubstituted or substituted alkylene are methylene, ethylene, phenylmethylene, diphenylmethylene, methylphenylmethylene. Illustrative examples of cycloalkylidene are cyclopentylidene, cyclohexylidene, cycloheptylidene and cyclooctylidene.

Illustrative examples of bisphenols are:

bis(p-hydroxyphenyl) ether or thioether, bis(p-hydroxylphenyl)sulfone, bis(p-hydroxylphenyl)methane, 1,2-bis(p-hydroxylphenyl)ethane, 1-phenyl-bis(p-hydroxylphenyl)methane, diphenyl-bis(p-hydroxylphenyl) methane, diphenylbis(p-hydroxylphenyl)methane, 2,2-bis (4'-hydroxy-3'-dimethylphenyl)propane, 1,1- or 2,2-bis(p-hydroxyphenyl)butane, 1,1-dichloro- or 1,1,1-trichloro-2,2-bis(p-hydroxylphenyl)ethane, 1,1 -bis(p-hydroxylphenyl) cyclopentane and, preferably, 2,2-bis(p-hydroxyphenyl) propane (bisphenol A) and 1,1-bis(p-hydroxyphenyl) cyclohexane (bisphenol C).

Suitable polyesters of hydroxycarboxylic acids typically include polycaprolactone, polypivalolactone or the polyesters of 4-hydroxycyclohexanecarboxylic acid or 4-hydroxybenzoic acid.

Polyesters with aromatic dicarboxylic acids have achieved the greatest importance, in particular the polyalkylene terephthalates. Inventive moulding materials are therefore preferred in which the polyester is comprised of at least 30 mol %, preferably of at least 40 mol %, of aromatic dicarboxylic acids, and of at least 30 mol%, preferably of at least 40 mol %, of alkylenediols containing preferably 2 to 12 carbon atoms, based on the polyester.

Especially in this case the alkylenediol is linear and contains 2 to 6 carbon atoms and is exemplified by ethylene, trimethylene, tetramethylene or hexamethylene glycol and the aromatic dicarboxylic acid terephthalic and/or isophthalic acid.

Particularly suitable polyesters are PET, PBT and corresponding copolymers and blends, as exemplified by PBT/PC, PBT/ASA, PBT/ABS, PET/ABS, PET/PC or also PBT/PET/PC, which predominantly contain the indicated polyesters; PET and its copolymers as well as PBT blends being especially preferred.

The most preferred polyester is the amorphous PET used for the manufacture of blow-moulded bottles. A further preferred form comprises the polyester recyclates originating from domestic and industrial waste or from useful material collections, from production waste or from obligatory returnables. These polyester recyclates consist primarily of PET bottle materials of different provenance and having a varying degree of damage. These recyclates may also contain minor amounts of other polymers, including polyolefins or PVC.

These recyclates may furthermore contain standard impurities such as dye residues, paint residues, metal traces, fuel residues or inorganic salts.

Difunctional epoxy resins may have an aliphatic, aromatic, cycloaliphatic, araliphatic or heterocyclic structure. They contain epoxy groups as side groups or these groups form part of an alicyclic or heterocyclic ring system. The epoxy groups are preferably linked to the residual molecule as glycidyl groups through ether or ester bonds, or they are N-glycidyl derivatives of heterocyclic amines, amides or imides. Epoxy resins of these types are commonly known and commercially available.

The epoxy resins contain two epoxy radicals, typically those of formula I

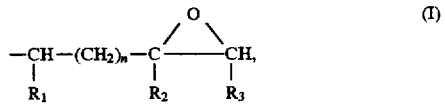

which radicals are linked direct to carbon, oxygen, nitrogen or sulfur atoms, wherein $R_1$ and $R_3$ are both hydrogen, $R_2$ is hydrogen or methyl, and n=0, or wherein $R_1$ and $R_3$ taken together are —CH₂—CH₂— or —CH₂—CH₂—CH₂—, in which case $R_2$ is hydrogen and n=0 or 1.

Illustrative examples of epoxy resins are:

I) Diglycidyl and di(β-methylglycidyl) esters which are obtainable by reacting a compound containing at least two carboxyl groups in the molecule and epichlorohydrin or glycerol dichlorohydrin or β-methyl epichlorohydrin. The reaction is conveniently carried out in the presence of a base.

Compounds containing at least two carboxyl groups in the molecule may suitably be aliphatic polycarboxylic acids.

Exemplary of these polycarboxylic acids are glutaric acid, adipic acid, pimelic acid, suberic acid, azelaic acid, sebacic acid or dimerised or trimerised linoleic acid.

Cycloaliphatische dicarboxylic acids may also be used, for example tetrahydrophthalic acid, 4-methyltetrahydrophthalic acid, hexahydrophthalic acid or 4-methylhexahydrophthalic acid.

Aromatic dicarboxylic acids may also be used, including phthalic acid or isophthalic acid.

II) Diglycidyl or di(β-methylglycidyl) ethers which are obtainable by reacting a compound containing at least two free alcoholic hydroxyl groups and/or phenolic hydroxyl groups in the molecule with a suitably substituted epichlorohydrin under alkaline conditions or in the presence of an acid catalyst and subsequent treatment with an alkali.

Ethers of this type are typically derived from acyclic alcohols such as ethylene glycol, diethylene glycol and higher poly(oxyethylene) glycols, 1,2-propanediol, or poly(oxypropylene) glycols, 1,3-propanediol, 1,4-butanediol, poly(oxytetramethylene) glycols, 1,5-pentanediol, 1,6-hexanediol, sorbitol, as well as from polyepichlorohydrins.

They may also be derived from cycloaliphatic alcohols such as 1,3- or 1,4-dihydroxycyclohexane, bis(4-hydroxycyclohexyl)methane, 2,2-bis(4-hydroxycyclohexyl) propane or 1,1-bis(hydroxymethyl)cyclohex-3-ene, or they contain aromatic nuclei, such as N,N-bis(2-hydroxyethyl) aniline or p,p'-bis(2-hydroxyethylamino)diphenylmethane.

The epoxy resins may also be derived from mononuclear phenols, as from resorcinol, 1,2-benzenediol or hydroquinone, or they are based on polynuclear phenols such as bis(4-hydroxyphenyl)methane, 2,2-bis(4-hydroxyphenyl)propane, 2,2-bis(3,5-dibromo-4-hydroxyphenyl)propane, 4,4'-dihydroxydiphenylsulfone, or 9,9-bis(4-hydroxyphenyl)fluorene, or on condensates of phenols with formaldehyde which are obtained under acid conditions, for example phenol novolaks.

III) Bis(N-glycidyl) compounds, obtainable typically by dehydrochlorination of the reaction products of epichlorohydrin with amines which contain two amino hydrogen atoms. These amines are typically aniline, toluidine, n-butylamine, bis(4-aminophenyl)methane, m-xylylenediamine or bis(4-methylaminophenyl)methane.

The bis(N-glycidyl) compounds, however, also include N,N'-diglycidyl derivatives of cycloalkylene ureas such as ethyleneurea or 1,3-popyleneurea, and N,N'-diglycidyl derivatives of hydantoins, typically of 5,5-dimethylhydantoin.

IV) Bis(S-glycidyl) compounds, typically bis(S-glycidyl) derivatives that are derived from dithiols such as 1,2-ethanedithiol or bis(4-mercaptomethylphenyl) ether.

V) Epoxy resins containing a radical of formula I, wherein $R_1$ and $R_3$ together are —CH$_2$—CH$_2$— and n is 0, typically bis(2,3-epoxycyclopentyl) ether, 2,3-epoxycyclopentylglycidyl ether or 1,2-bis(2,3-epoxycyclopentyloxy) ethane. Epoxy resins containing a radical of formula I, wherein $R_1$ and $R_3$ together are —CH$_2$—CH$_2$— and n is 1, is typically 3,4-epoxy-6-methylcyclohexyl-3',4'-epoxy-6'-methylcyclohexanecarboxylate.

By reason of the preparative process, the above-mentioned difunctional epoxy resins may contain minor amounts of mono- or trifunctional groups.

Diglycidyl compounds of aromatic structure are mainly used.

It is also possible to use a mixture of epoxy resins of different structure.

Particularly preferred difunctional epoxy resins are diglycidyl ethers of bisphenols, typically 2,2-bis(4-hydroxyphenyl)propane (bisphenol A), bis(4-hydroxyphenyl)sulfone (bisphenol S) or mixtures of bis(ortho-/para-hydroxyphenyl)methane (bisphenol F).

Solid epoxy resins of the diglycidyl ether of bisphenol A type are very particularly preferred, e.g.: Araldite® GT 6071, GT 7071, GT 7072, GT 6097 and GT 6099.

Sterically hindered hydroxyphenylalkylphosphonic acid esters and half-esters are disclosed, inter alia, in U.S. Pat. No. 4,778,840, and may be illustrated by the following formula:

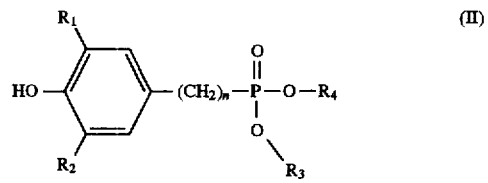

wherein $R_1$ is isopropyl, tert-butyl, cyclohexyl or cyclohexyl which is substituted by 1 to 3 $C_1$–$C_4$alkyl groups;

$R_2$ is H, $C_1$–$C_4$alkyl, cyclohexyl or cyclohexyl which substituted by 1 to 3 $C_1$–$C_4$alkyl groups;

$R_3$ is $C_1$–$C_{20}$alkyl or substituted or unsubstituted phenyl or naphthyl;

$R_4$ is H, $M^{2+}/2$, $C_1$–$C_{20}$alkyl or substituted or unsubstituted phenyl or naphthyl;

$M^{2+}$ is a divalent metal cation, and n is 1 to 6.

Substituents defined as alkyl containing up to 20 carbon atoms may suitably be methyl, ethyl, propyl, butyl, pentyl, hexyl and octyl, stearyl, as well as corresponding branched isomers. $C_2$–$C_4$Alkyl is preferred.

Suitable substituents of the phenyl or naphthyl radicals are typically $C_1$–$C_4$alkyl groups.

Suitable divalent metal cations are Zn, Ba, Ca and Mg. Ca is particularly preferred.

Preferred compounds of formula (II) are those that contain at least one tert-butyl group as $R_1$ or $R_2$. Compounds in which $R_1$ and $R_2$ are tert-butyl (in the formulae:

are very particularly preferred.

Preferably n is 1 or 2 and, most preferably, 1.

Very particularly preferred sterically hindered hydroxyphenylalkylphosphonic acid esters and half-esters are

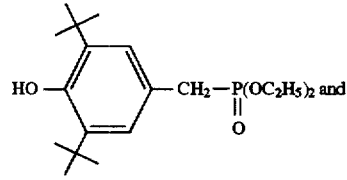

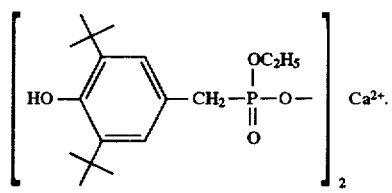

The process can be carried out in any heatable apparatus fitted with a stirrer. The process may, however, also be carried out in an extruder or in a kneader. It is immaterial whether the process is carried out under an inert gas atmosphere ($N_2$) or in the presence of atmospheric oxygen.

The polyester material to be heated and the mixture of epoxy resin and phenol are usually charged to the apparatus at the start of heating; but a subsequent addition of the epoxy resin/phenol mixture to the polyester is also possible, in which case the mixture itself may be added or else the single components may be added in any order. For the addition, the epoxy resin and the phenol can independently of each other be in the form of a powder, liquid, granulate or in compacted form, or also in some cases on a substrate such as silica gel or together with a polymer powder or wax such as a polyethylene wax. Heating to above the melting point or glass transition temperature is normally carried out with stirring until the epoxy resin/phenol mixture is homogenised. The temperature will depend on the polyester used. In the case of crystalline polyesters it is preferred to carry out the process in the range from the melt temperature to about 50° C. above the melt temperature. In the case of amorphous polyesters, the process is carried out in the range from c. 50° C. to 150° C. above the respective glass transition temperature.

Usually from 0.05 part to 10 parts, preferably from 0.10 to 3 parts, of a difunctional epoxy resin and 0.01 part to 5 parts, preferably 0.05 to 1 part, of a sterically hindered hydroxyphenylalkylphosphonic acid ester or half-ester, are added per 100 parts of polyester. The amount of epoxy resin and sterically hindered hydroxyphenylalkylphosphonic acid ester or half-ester will depend on the initial molecular weight of the polymer and on the desired final molecular weight. Thus, when using a severely damaged polyester, i.e. one having a low molecular weight, it is preferred to use an epoxy resin and a phenol in the upper weight region. But if only a low increase in molecular weight is desired, then it is preferred to use an epoxy resin and a phenol in low concentration, most especially if it is desired to effect only stability during processing.

In addition to the mixture of a difunctional epoxy resin and a sterically hindered hydroxyphenylalkylphosphonic acid ester or half-ester, it it also possible to add different modifiers, preferably stabilisers, to the polyester. Those skilled in the art will be familiar with these stabilisers, which will be chosen in accordance with the specific requirement made of the final product. In particular light stabilisers or also antioxidants can be added ("Plastics Additives Handbook", Ed. R. Gächter and H. Müller, Hanser Verlag, 3rd ed. 1990; in particular pages 92/94 und 258/259). It is also possible to add further ingredients, typically slip agents, mould release agents, fillers or reinforcing agents such as glass fibres, flame retardants, antistatic agents.

Particularly suitable stabilisers include:

a) Antioxidants such as the esters of β-(3,5-di-tert-butyl-4-hydroxyphenyl) propionic acid and β-(5-tert-butyl-hydroxy-3-methylphenyl) -propionic acid with monohydric or polyhydric alcohols, for example with methanol, octadecanol, 1,6-hexanediol, neopentyl glycol, thiodiethylene glycol, diethylene glycol, triethylene glycol, pentaerythritol, tris(hydroxyethyl) isocyanurate, N,N'-bis(hydroxyethyl)oxamide, as well as the amides of these acids, e.g. N,N'-bis-(3,5-di-tert-butyl-4-hydroxyphenylpropionyl)hexamethylenediamine, N,N'-bis (3,5-di-tert-butyl-4-hydroxyphenylpropionyl) trimethylenediamine and N,N'-bis(3,5-di-tert-butyl-4-hydroxyphenylpropionyl)hydrazine.

Preferred antioxidants are those of the Irganox 1098 and Irganox 245 type, preferably in conjunction with aromatic phosphites or phosphonites. Illustrative examples of such phosphites or phosphonites are triphenyl phosphite, diphenyl alkyl phosphites, phenyl dialkyl phosphites, tris (nonylphenyl)phosphite, trilauryl phosphite, trioctadecyl phosphite, distearyl pentaerythritol diphosphite, tris(2,4-di-tert-butylphenyl)phosphite, distearyl pentaerythritol diphosphite, bis(2,4-di-tert-butylphenyl) pentaerythritol diphosphite, tristearyl sorbitol triphosphite, tetrakis(2,4-di-tert-butylphenyl)-4,4'-biphenylene diphosphonite, 3,9-bis(2, 4-di-tert-butyl-4-methylphenoxy)-2,4,8,10-tetraoxa-3,9-diphosphaspiro[5.5]undecane, 3,9-tris(2,4,6-tris-tert-butylphenoxy)-2,4,8,10-tetraoxa-3,9-diphosphaspiro[5.5] undecane and 2,2'-ethylidene-bis(4,6-di-tert-butylphenyl) fluorophosphite. Irgafos 168 is particularly preferred.

b) Light stabilisers such as 1. 2-(2'-Hydroxyphenyl)benzotriazoles, for example 2-(2'-hydroxy-5'-methylphenyl) benzotriazole, 2-(3',5'-di-tert-butyl-2'-hydroxyphenyl) benzotriazole, 2-(5'-tert-butyl-2'-hydroxyphenyl) benzotriazole, 2-(2'-hydroxy-5'-(1,1,3,3-tetramethylbutyl) phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α, α-dimethylbenzyl)-2'-hydroxyphenyl)benzotriazole, mixture of 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl) benzotriazole, 2-(3'-tert-butyl-5'-[2-(2-ethylhexyloxy) carbonylethyl]-2'-hydroxyphenyl)benzotriazole, 2-(3'-dodecyl-2'-hydroxy-5'-methylphenyl)benzotriazole, and 2-(3'-tert-butyl-2'-hydroxy-5'-(2-isooctyloxycarbonylethyl) phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—$CH_2CH_2$—COO($CH_2$)₃]₂, where R=3'-tert-butyl-4'-hydroxy-5'-2H-benzotriazol-2-ylphenyl.

2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

3. Esters of substituted and unsubstituted benzoic acids, as for example 4-tertbutyl-phenyl salicylate, phenyl salicylate, octylphenyl salicylate, dibenzoyl resorcinol, bis (4-tert-butyl-benzoyl) resorcinol, benzoyl resorcinol, 2,4-di-tertbutylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate and N-(β-carbomethoxy-β-cyanovinyl)-2-methylindoline.

5. Nickel compounds, for example nickel complexes of 2,2'-thio-bis-[4-(1,1,3, 3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

6. Sterically hindered amines, for example bis(2,2,6,6-tetramethyl-piperidyl)sebacate, bis-(2,2,6,6-tetramethyl-piperidyl)succinate, bis(1,2,2,6,6-pentamethylpiperidyl)sebacate, bis-(1,2,2,6,6-pentamethylpiperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, the condensate of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl) nitrilotriacetate, tetrakis(2,2,6,6-tetramethyl-4-piperidyl)-1,2,3,4-butane-tetracarboxylate, 1,1'-(1,2-ethanediyl)bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazasprio[4.5]decan-2,4-dion, bis(1-octyloxy-2,2,6,6-tetramethylpiperidyl)sebacate, bis(1-octyloxy-2,2,6,6-tetramethylpiperidyl)succinate, the condensate of N,N'-bis-(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)- 1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1 -(2,2,6,6-tetramethyl-4-piperidyl) pyrrolidin-2,5-dione, 3-dodecyl-1-(1,2,2,6,6-pentamethyl-4-piperidyl)pyrrolidine-2,5-dione.

7. Oxamides, for example 4,4'-dioctyloxyoxanilide, 2,2'-dioctyloxy-5,5'-di-tert-butoxanilide, 2,2'-didodecyloxy-5,5'-di-tert-butoxanilide, 2-ethoxy-2'-ethoxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide and mixtures of ortho- and para-methoxy-disubstituted oxanilides and mixtures of o- and p-ethoxy-disubstituted oxanilides.

8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-[2-hydroxy-4-(2hydroxy-3-butyloxy-propoxy)phenyl]-4,-bis(2,4-dimethyl)-1,3,5-triazine, 2-[2-hydroxy-4-(2-hydroxy-3-octyloxy-propyloxy)phenyl]-4,6-bis(2,4-dimethyl)-1,3,5-triazine.

Preferred light stabilisers are those of classes 1, 6 and 7, including light stabilisers of the Chimassorb 944, Chimassorb 119, Tinuvin 234, Tinuvin 312 or Tinuvin 770 type.

If the polyester is a recyclate, it can also be blended with new material or used together with new material, conveniently in a co-extrusion process.

Further eligible substances are the catalysts that are usually added for curing epoxy resins.

The invention further relates to the use of a mixture comprising a difunctional epoxy resin and a sterically hindered hydroxyphenylalkylphosphonic acid ester or half-ester for increasing the molecular weight of polyesters and, in particular of polyester recyclates. The preferred utilities and preferred polyesters are the same as those referred to in connection with the process.

The invention also relates to polyesters and polyester recyclates comprising a difunctional epoxy resin and a sterically hindered hydroxyphenylalkylphosphonic acid ester or half-ester. The preferences in connection with said polyesters are the same as those referred to in connection with the process.

The invention is illustrated by the following non-limitative Examples in which and in the remainder of the description, unless otherwise stated, parts and percentages are by weight.

EXAMPLES 1–3

In a glass tube with stirrer, a predried PET granulate (Melinar® B90 S, ICI) and the components are heated under a stream of nitrogen in an oil bath heated to 280° C. After 10 minutes the polymer blend is sufficiently fused to be stirrable. The blend is stirred for 20 minutes and then removed from the glass tube. The intrinsic viscosity [η] is determined by measuring a solution of 1 g of the polymer in 100 g of o-dichlorobenzene/phenol (1:1) at 30° C. The amounts and the results obtained are set forth in Table 1.

TABLE 1

| | Increase in molecular weight of PET | | |
|---|---|---|---|
| | Parts of epoxy resin (per 100 parts PET) | Parts of hindered phenol (per 100 parts PET) | Int. visc.* (dl/g) |
| Example | | | |
| A | — | — | 0.56 |
| B | 2 Araldite GT 6071 | — | 0.61 |
| C | — | 1  Irganox 1425 | 0.53 |
| 1 | 1 Araldite GT 6071 | 1  Irganox 1425 | 0.78 |
| 2 | 2 Araldite GT 6071 | 0.25 Irganox 1425 | 0.86 |
| 3 | 2 Araldite GT 6099 | 0.5 Irganox 1425 | 0.94 |

*intrinsic viscosity [η]: $\lim_{c \to 0} \eta_{red.} = \lim_{c \to 0} [(\eta_{rel.} - 1)1/c]$ Table 1 relating to Examples 1 to 3, according to the instant invention, show a marked increase in intrinsic viscosity, thereby indicating an increase in molecular weight.

EXAMPLE 4

Following the procedure of Examples 1–3, a PET recyclate from a bottle collection originating from GB in the form of scrap material is fused with one part of Araldite® GY 281 and one part of Irganox® 1425. An intrinsic viscosity of 0.82 dl/g is determined.

COMPARISON EXAMPLE D

Without additives the intrinsic viscosity is only 0.47 dl/g.

EXAMPLES 5–9

In accordance with Examples 1–3 experiments are carried out with the indicated polyesters and additives and the following results are obtained:

| Ex. | Polyester | Parts of epoxy resin (based on 100 parts of PET) | Parts of hindered phenol (based on 100 parts of PET) | Int. viscosity [dl/g] |
|---|---|---|---|---|
| E | copolyester Kodapak 9921 W ([η] = 0.76) 280° C./30 min | — | — | 0.53 |
| 5 | copolyester Kodapak 9921 W ([η] = 0.76) 280° C./30 min | 0.5 Araldite GT 6071 | 0.5 Irganox 1425 | 0.80 |
| F | polybutylene terephthalate ([η] = 0.86) 250° C./30 min | — | — | 0.81 |
| 6 | polybutylene terephthalate ([η] = 0.86) 250° C./30 min | 1 Araldite GT 6071 | 1 Irganox 1425 | 0.92 |
| 7 | polybutylene te rephthalate ([η] = 0.86) 250° C./30 min | 1 Araldite GT 6071 | 1 Irganox 1222 | 0.92 |
| G | PET recyclate, ex NL ([η] = 0.78) 280° C./30 min | — | — | 0.62 |
| 8 | PET recyclate ex NL ([η] = 0.78) 280° C./30 min | 1 Araldite GT 6071 | 1 Irganox 1425 | 0.90 |
| 9 | PET recyclate, ex NL ([η] = 0.78) 280° C./30 min | 1 Araldite GY 281 | 1 Irganox 1425 | 0.88 |

EXAMPLE 10

A PET (Kodapak 7352) is prepared with the indicated ingredients in a glass reactor in accordance with Examples 1–3. The resultant material is afterwards moulded in a heatable press at 260° C./50 kN for 4 minutes to 2 mm thick test sheets, which are kept at 100° C. for 24 h in a circulating air oven, and the Yellowness Index is determined according to ASTM D-1925-70.

| Ex. | Parts of epoxy resin (per 100 parts of PET) | Parts of hindered phenol (per 100 parts of PET) | [η] [dl/g] | YI |
|---|---|---|---|---|
| H | — | — | 0.33 | 12.7 |
| J | 1 Araldite GT 6071 | — | 0.56 | 8.3 |
| 10 | 1 Araldite GT 6071 | 1 Irganox 1425 | 0.83 | 5.4 |

Example 10, according to the instant invention, shows in addition to an increase in molecular weight a lower YI value, thereby indicating enhanced stability.

The difunctional epoxy resins used in the Examples are:

Araldite® GT 6071
(diglycidyl ether of bisphenol A having an epoxy value of 2.15–2.22 eq/kg and a softening range of 70°–75° C.)

Araldite® GT 6099
(diglycidyl ether of bisphenol A having an epoxy value of 0.34–0.42 eq/kg and a softening range of 143°–158° C.)

Araldite® GY 281
(diglycidyl ether of bisphenol F)

The sterically hindered hydroxyphenylalkylphosphonic acid esters and half-esters used in the Examples are:

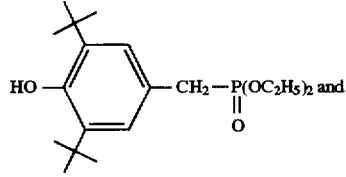

Irganox® 1222

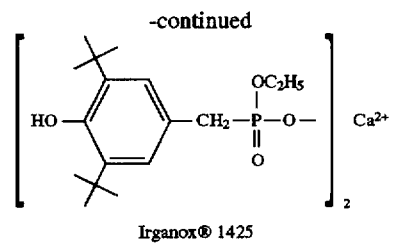

Irganox® 1425

What is claimed is:

1. A process for increasing the molecular weight of a polyester, which comprises heating a mixture of a crystalline and/or amorphous polyester blended with a difunctional epoxy resin and a sterically hindered hydroxyphenylalkylphosphonic half-ester of formula (I)

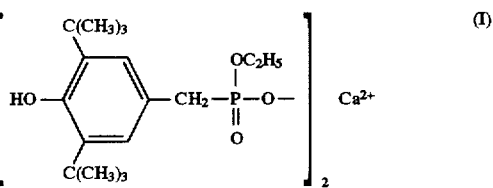

to above the melting point of said crystalline polyester or above the glass transition temperature of said amorphous polyester.

2. A process according to claim 1, wherein the polyester is a polyester blend of polybutylene terephthalate/polycarbonate, polybutylene terephthalate/acrylonitrile-butadiene-styrene resin or polybutylene terephthalate/acrylonitrile-styrene-acrylic resin.

3. A process according to claim 1, which comprises using a polyester recyclate recovered from domestic waste, industrial waste or useful material collections, production waste or obligatory returnables.

4. A process according to claim 1, wherein the difunctional epoxy resin is an aromatic epoxy resin.

5. A process according to claim 1, wherein the difunctional epoxy resin is a diglycidyl ether of bisphenol.

6. A process according to claim 1, wherein the difunctional epoxy resin is a diglycidyl ether of 2,2-bis(4-hydroxyphenyl)propane.

7. A process according to claim 1, which comprises using 0.05 part to 10 parts of the difunctional epoxy resin and 0.01 part to 5 parts of the sterically hindered hydroxyphenylalkylphosphonic acid ester or half-ester per 100 parts of polyester.

8. A process according to claim 1, which comprises using 0.10 part to 3 parts of the difunctional epoxy resin and 0.05 to 1 part of the sterically hindered hydroxyphenylalkylphosphonic acid ester or half-ester per 100 parts of polyester.

9. A process according to claim 1, wherein the polyester is polyethylene terephthalate or a copolyester thereof.

* * * * *